United States Patent
LaCroix

(10) Patent No.: US 11,392,167 B2
(45) Date of Patent: Jul. 19, 2022

(54) DEVICE CLOCK SETTING WHILE BOOTING A DEVICE

(71) Applicant: HEWLETT PACKARD ENTERPRISE DEVELOPMENT LP, Houston, TX (US)

(72) Inventor: Dennis R. LaCroix, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 255 days.

(21) Appl. No.: 16/298,090

(22) Filed: Mar. 11, 2019

(65) Prior Publication Data

US 2020/0293083 A1   Sep. 17, 2020

(51) Int. Cl.
*G06F 1/14* (2006.01)
*G06F 9/4401* (2018.01)
*H04L 67/1087* (2022.01)

(52) U.S. Cl.
CPC .............. *G06F 1/14* (2013.01); *G06F 9/4416* (2013.01); *H04L 67/1093* (2013.01)

(58) Field of Classification Search
CPC ........ G06F 1/14; G06F 9/4416; G06F 9/4401; H04L 67/1093
See application file for complete search history.

(56) References Cited

U.S. PATENT DOCUMENTS

| | | | |
|---|---|---|---|
| 6,728,880 B1 * | 4/2004 | Sites ..................... | H04L 9/3297 713/178 |
| 7,814,360 B2 | 10/2010 | Rai et al. | |
| 9,104,343 B2 | 8/2015 | Ruesch et al. | |
| 2004/0125822 A1 * | 7/2004 | Jun ........................ | H04J 3/0661 370/503 |
| 2006/0294593 A1 * | 12/2006 | Eldar ........................ | G06F 1/14 726/26 |
| 2008/0168565 A1 * | 7/2008 | Reinikainen ........... | H04H 60/14 726/26 |
| 2014/0095887 A1 * | 4/2014 | Nayshtut ............... | G06F 21/725 713/189 |
| 2014/0095918 A1 * | 4/2014 | Stahl ..................... | G06F 21/725 713/500 |
| 2014/0301513 A1 | 10/2014 | Takahashi et al. | |

(Continued)

FOREIGN PATENT DOCUMENTS

| | | |
|---|---|---|
| CN | 105959078 | 2/2018 |
| EP | 1601124 | 1/2008 |
| WO | WO-2017211159 | 12/2017 |

OTHER PUBLICATIONS

Molter, T.; "How to Synchronize Time across a Linux Cluster"; Aug. 4, 2015; 7 pages.

*Primary Examiner* — Jaweed A Abbaszadeh
*Assistant Examiner* — Hyun Soo Kim
(74) *Attorney, Agent, or Firm* — Jaffery Watson Mendonsa & Hamilton

(57) ABSTRACT

A computing device may perform a method that includes determining whether internal time reference data is available while booting the computing device. When the internal time reference data is unavailable, the device clock is set to a default time setting. However, when the internal time reference data is available while booting the computing device, the method includes searching the internal time reference data for a most recent time reference, and setting the device clock to a current time setting based on the most recent time reference.

18 Claims, 6 Drawing Sheets

(56) References Cited

U.S. PATENT DOCUMENTS

2015/0154814 A1* 6/2015 Kalinadhabhotla .... G07C 5/008
        701/31.5
2018/0088625 A1* 3/2018 Krithivas .............. G06F 21/725

* cited by examiner

DEVICE CLOCK SETTING WHILE BOOTING A DEVICE

BACKGROUND

Some computing devices are constructed with a battery backup, which allows the computing device to maintain its internal clock setting upon a sudden power loss. Computing devices without a battery backup may be without an accurate clock setting upon power loss until the computing device can connect to an external clock source.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion. Features of the present disclosure are illustrated by way of example and not limited in the following figures, in which like numerals indicate like elements, in which.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

During a cold boot, a computing device without a battery backup may reset its internal clock, also referred to herein as a device clock, to a static default time setting having a much older date. Once a network connection to an external time source is available, the computing device may synchronize its device clock with the external time source. However, before synchronizing its device clock to the external time source, the computing device may execute one or more algorithms, such as certificate validity checking, which depend on absolute time. These algorithms may fail when executed based on the default time setting of the device clock.

Disclosed herein are methods and systems for setting a device clock while booting a device. In an example, a computing device may perform a method that includes determining whether internal time reference data is available while booting the computing device. When the internal time reference data is unavailable, the device clock is set to a default time setting. However, when the internal time reference data is available while booting the computing device, the method includes searching the internal time reference data for a most recent time reference, and setting the device clock to a current time setting based on the most recent time reference.

Accordingly, the device clock may be set to a time that is closer to the actual time when implementing one or more examples of the present disclosure. This may enable algorithms that depend on absolute time to have a higher likelihood of succeeding. In another example according to the present disclosure, the computing device is included in a cluster of computing devices that may connect to each other before one or more of the computing devices have a network connection. In this example, the computing devices may synchronize their devices clocks to a more accurate clock setting among the device clock settings to further improve the accuracy of the device clock settings. The more accurate clock setting is one that is closer to the actual time. In one example, the more accurate clock setting is one that is closet to a trusted time provided by an external time source.

Figure 1:
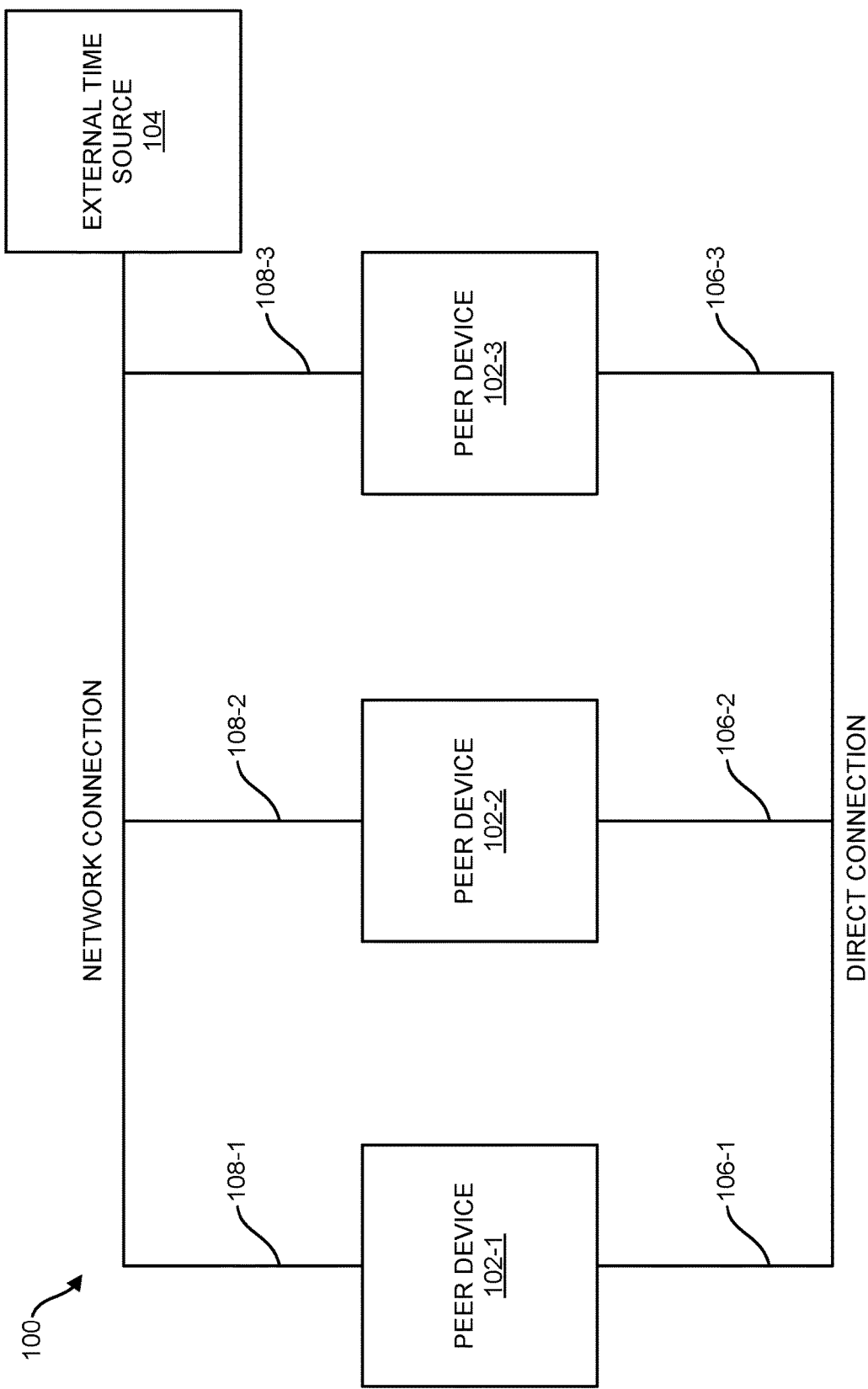
FIG. 1 depicts a system architecture within which can be implemented a device clock setting while booting a device, according to one or more examples of the present disclosure.

Turning now to the drawings, FIG. 1 depicts a system architecture 100 within which can be implemented a device clock setting while booting a device, according to one or more examples of the present disclosure. System architecture 100 includes three peer devices 102-1, 102-2, and 102-3 (collectively referred to as peer devices 102), and an external time source 104. The peer device 102-1 has a direct connection 106-1 to the peer devices 102-2 and 102-3 and a network connection 108-1 to the external time source 104. The peer device 102-2 has a direct connection 106-2 to the peer devices 102-1 and 102-3 and a network connection 108-2 to the external time source 104. The peer device 102-3 has a direct connection 106-3 to the peer devices 102-1 and 102-2 and a network connection 108-3 to the external time source 104. Since, the peer devices 102 have direct connections 106-1, 106-2, 106-3 to each other, they can be said to form a cluster of peer devices.

The peer devices 102 may be any computing device that includes a device clock. In an example, one or more of the peer devices 102 does not have a battery backup. In a particular example, the peer devices 102 are embedded devices on a same computing platform and may share a common enclosure. The external time source 104 may be any computing device that provides a trusted time, such as trusted time server. For example, the trusted time server may be a Network Time Protocol (NTP) server, e.g., a National Institute of Standards and Technology (NIST) Internet Time server, which provides a trusted time to computing devices over the Internet in real time using NTP.

In an example, the peer devices 102 have a direct serial connection 106-1, 106-2, 106-3, for instance over a serial bus. However, the peer devices 102 may have any suitable direct wired connection. In another example, the direct connection 106-1, 106-2, 106-3 may be a wireless connection, for instance using a suitable short-ranged wireless protocol such as Bluetooth®. As used herein, a "direct" connection between two devices is one in which there is no intermediary computing device or network of computing devices that facilitates communication between the devices.

A "network" connection between two devices, however, is one that uses a network of one or more computing devices to facilitate communication between the devices. The network connections 108-1, 108-2, 108-3 between the external time source 104 and the peer devices 102 may be a wireless connection or a wired connection. Accordingly, the network connections 108-1, 108-2, 108-3 may be facilitated using any of a variety of proprietary or standardized network protocols, such as Ethernet, Transmission Control Protocol/Internet Protocol (TCP/IP), WiFi®, cellular, and/or other communication methods.

Figure 2:
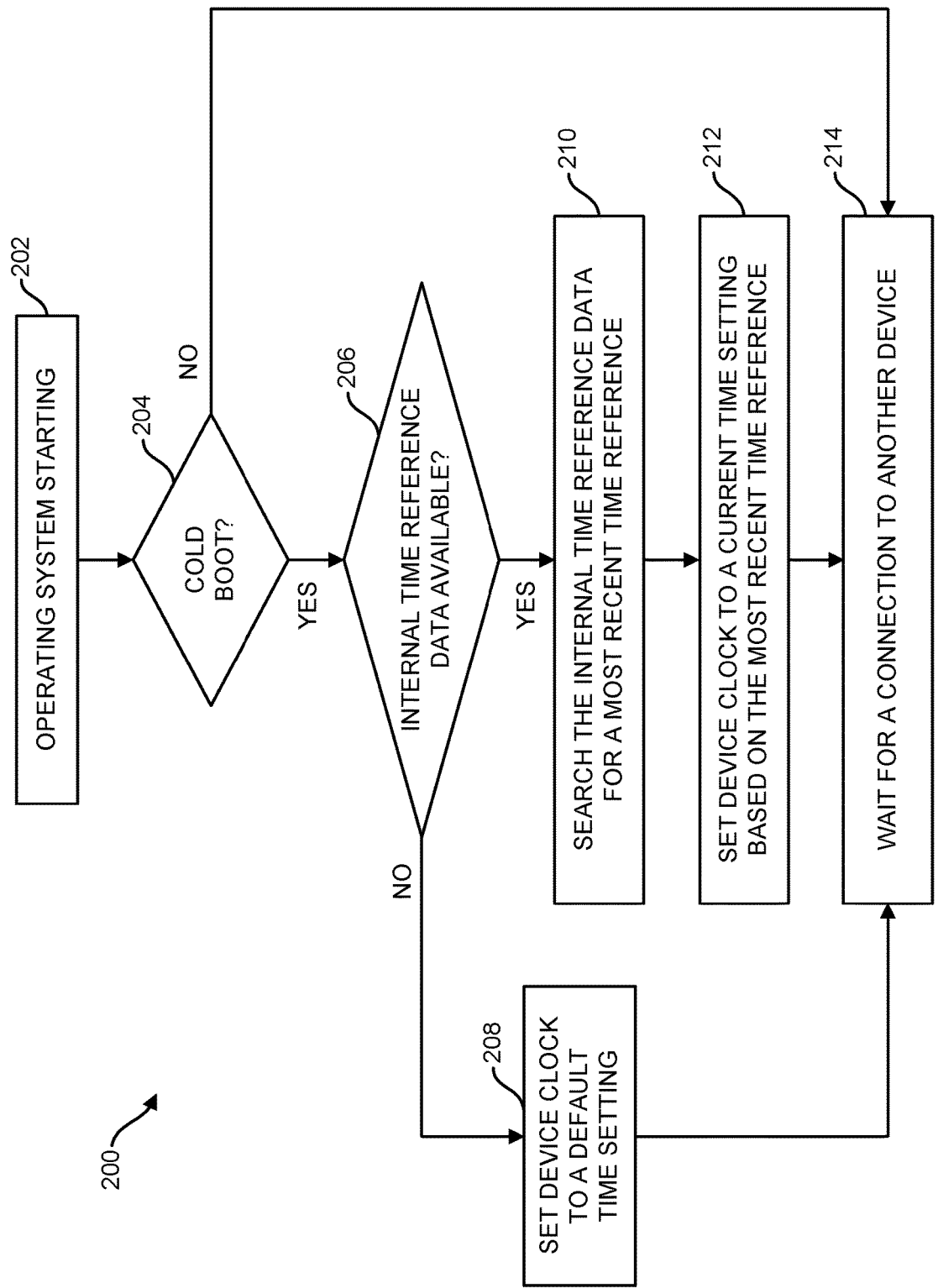
FIG. 2 depicts a flow diagram of a method for setting a device clock while booting a device, according to one or more examples of the present disclosure.

FIG. 2 depicts a flow diagram of a method 200 for setting a device clock while booting a device, according to one or more examples of the present disclosure. The method 200 may be performed by any one or more of the peer devices 102. In an example, the peer device 102-1 does not have a battery backup and, thereby, performs the method 200. In a particular example, the peer device 102-1 performs method 200 during booting or start-up of the computing device. Accordingly, the peer device 102-1 starts (202) its operating system and determines (204) whether the boot is a cold boot. A cold boot, also referred to as a hard boot, is where the device starts from a powerless state, prior to which the computing device may not have been shut down in an orderly manner, skipping activities that would occur on an orderly shutdown. A cold boot may result from applying a reset, a power failure or unexpected loss of power, a random reboot, etc. By contrast, a warm boot may be performed by the operating system without a loss of power.

When the boot is not a cold boot, the peer device 102-1 waits (214) for a connection to another device, for instance to one or both of the peer devices 102-2, 102-3 or to the external time source 104. When the boot is a cold boot, the peer device 102-1 determines (206) whether internal time reference data is available. In one example, the peer device 102-1 examines one or more internal non-volatile data sources to determine whether the internal time reference data is available while booting the device. For example, the one or more internal time reference sources include non-volatile data stored in a memory resource of the peer device 102-1. The time reference data is "internal" in that it is stored in a memory resource of the peer device 102-1 which is not accessible to other computing devices, such as the peer devices 102-2 and 102-3, unless the peer device 102-1 provides the data to the other computing devices.

In a particular example, the non-volatile data sources may include debug logs or other logs and various settings that may include timestamp data, which may be used as the internal time reference data. In another example, the non-volatile data sources may include timestamp data generated by various eventing protocols such as Extensible Messaging and Presence Protocol (XMPP) or another personal eventing protocol.

When the internal time reference data is unavailable, the peer device 102-1 sets (208) its device clock to a default time setting. The default setting may be a static setting stored in the memory resource of the peer device 102-1. The internal time reference data may be unavailable, for instance, due to a failure of the memory resource or corruption of the data stored thereon.

When the internal time reference data is available, the peer device 102-1 searches (210) the internal time reference data for a most recent time reference. For example, the peer device 102-2 searches the non-volatile data for a most recent timestamp as the most recent time reference data. The peer device 102-1 then set (212) its device clock to a current time setting based on the most recent time reference, e.g., the most recent timestamp found within the non-volatile data. In one example, the peer device 102-1 sets (212) its device clock to the most recent time reference data found, for instance the time and date indicated by the most recent timestamp. In another example, the peer device 102-1 adjusts the most recent time reference to generate a time setting for its device clock, which takes into consideration one or more additional parameters such as clock drift and/or transmission delay. Upon setting (212) its device clock, the peer device 102-1 may wait (214) for a connection to another device.

Figure 3:
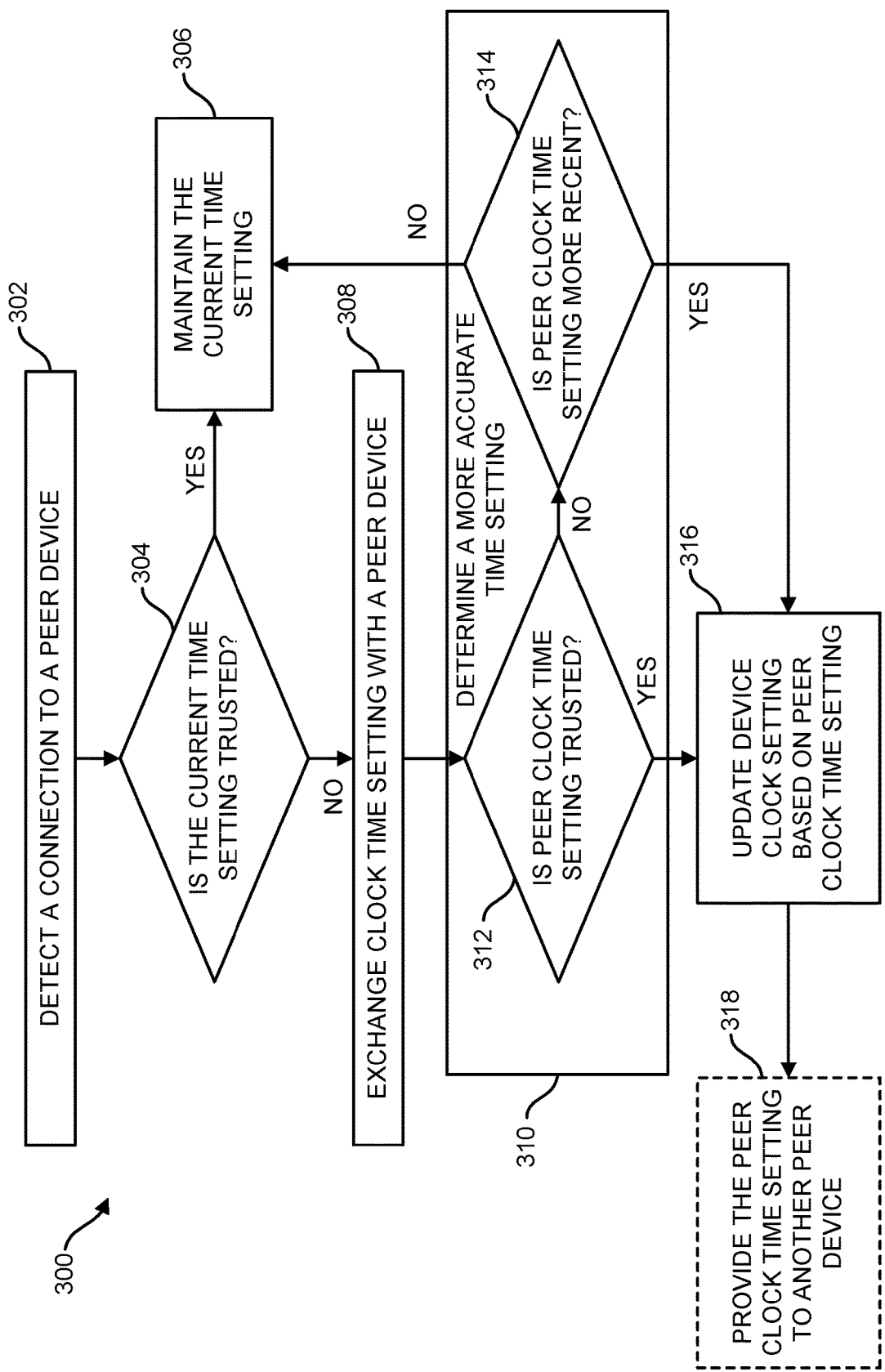
FIG. 3 depicts a flow diagram of a method for setting a device clock while booting a device, according to one or more examples of the present disclosure.

FIG. 3 depicts a flow diagram of a method 300 for setting a device clock while booting a device, according to one or more examples of the present disclosure. In one example, the peer devices 102 may detect a connection, e.g., a serial connection, therebetween before connecting to the network. As such, one or more of the peer devices 102 may perform the method 300 to further update its device clock to a more accurate time setting. Device clock synchronization between computing devices within a cluster, e.g. the peer devices 102, may be most enhanced when all of the computing devices in the cluster perform the method 300.

In an example, the peer device 102-1 performs the method 300. Accordingly, the peer device 102-1 detects (302) a connection to another peer device, for instance the peer device 102-2 or the peer device 102-3 or both. The peer device 102-1 determines (304) whether a current time setting of its device clock is trusted. For example, the where the peer device 102-1 has undergone or is in the process of a cold start and has not synchronized its device clock to the external time source 104, the peer device 102-1 may determine (304) that the current setting of its device clock is not trusted. In another example, the peer device 102-1 may have undergone or is in the process of undergoing a warm start and may determine (304) that the current setting of its device clock is trusted. In another example, the peer device 102-1 may have synchronized its device clock to the external time source 104 and may determine (304) that the current setting of its device clock is trusted.

When the peer device 102-1 determines that the current time setting of its device clock is trusted, the peer device 102-1 maintains (306) the current time setting. However, when the peer device 102-1 determines that the current time setting of its device clock is not trusted, the peer device 102-1 exchanges (308) its clock time setting with a peer device, e.g., the peer device 102-2 or the peer device 102-3 or both. In an example, the peer device 102-1 exchanges (308) its clock time setting with the peer device 102-2 by sending the current time setting of its device clock to the peer device 102-2 and receiving a peer clock time setting from the peer device 102-2.

The peer device 102-1 may then determine (310) a more accurate time setting between the current time setting of its device clock and the peer clock time setting received from the peer device 102-2. In an example, when determining (310) the more accurate time setting, the peer device 102-1 determines (312) whether the peer clock time setting is trusted. The peer clock time setting may be trusted where the peer device 102-2 has synchronized its device clock with a trusted time provided by the external time source 104. The peer clock time setting may be trusted where the peer device 102-2 has a battery backup. In an example, the peer device 102-2 communicates to the peer device 102-1 over the respective direct connections 106-2, 106-1 whether the peer clock time setting is trusted.

When the peer device 102-1 determines (312) that the peer clock time setting is not trusted, the peer device 102-1 determines (314) whether its current time setting or the peer clock time setting is more recent. When its current time setting is more recent, the peer device 102-1 determines (310) that its current time setting is more accurate than the peer clock time setting provided by the peer device 102-2 and maintains (306) its current time setting. Alternatively, when the peer device 102-1 determines (312) that the peer clock time setting is trusted or determines (314) that the peer clock time setting is more recent, the peer device 102-1 determines (310) that the peer clock time setting is more accurate than its current time setting. Thus, the peer device 102-1 updates (316) its device clock setting based on the peer clock time setting of the peer device 102-2. In one example, the peer device 102-1 updates (316) its device clock to the peer clock time setting, for instance the time and date indicated by the peer clock time setting. In another example, the peer device 102-1 adjusts the peer clock time setting to generate a time setting for its device clock, which takes into consideration one or more additional parameters such as clock drift and/or transmission delay.

Upon updating (316) its device clock, the peer device 102-1 may provide (318) the peer clock time setting to another peer device, e.g., the peer device 102-3, to further synchronize the device clocks of the peer devices 102. In one example, the peer device 102-2 pushes the peer clock time setting of the peer device 102-2 to the peer device 102-3, where the peer clock time setting of the peer device 102-2 is trusted. The peer device 102-1 may communicate the trusted time setting to the peer device 102-3 over their respective direct connections 106-1, 106-3. In another example, the peer device 102-1 repeats the method 300 to, in part, determine (310) a more accurate time setting between its device clock setting and the device clock setting of the peer device 102-3. The peer device 102-1 performing the method 300 multiple times with different peer devices may enable a monotonically increasing time of its device clock which is closer to the actual time than is achievable when the method 300 is not performed or when the method 300 is performed only once.

Figure 4:
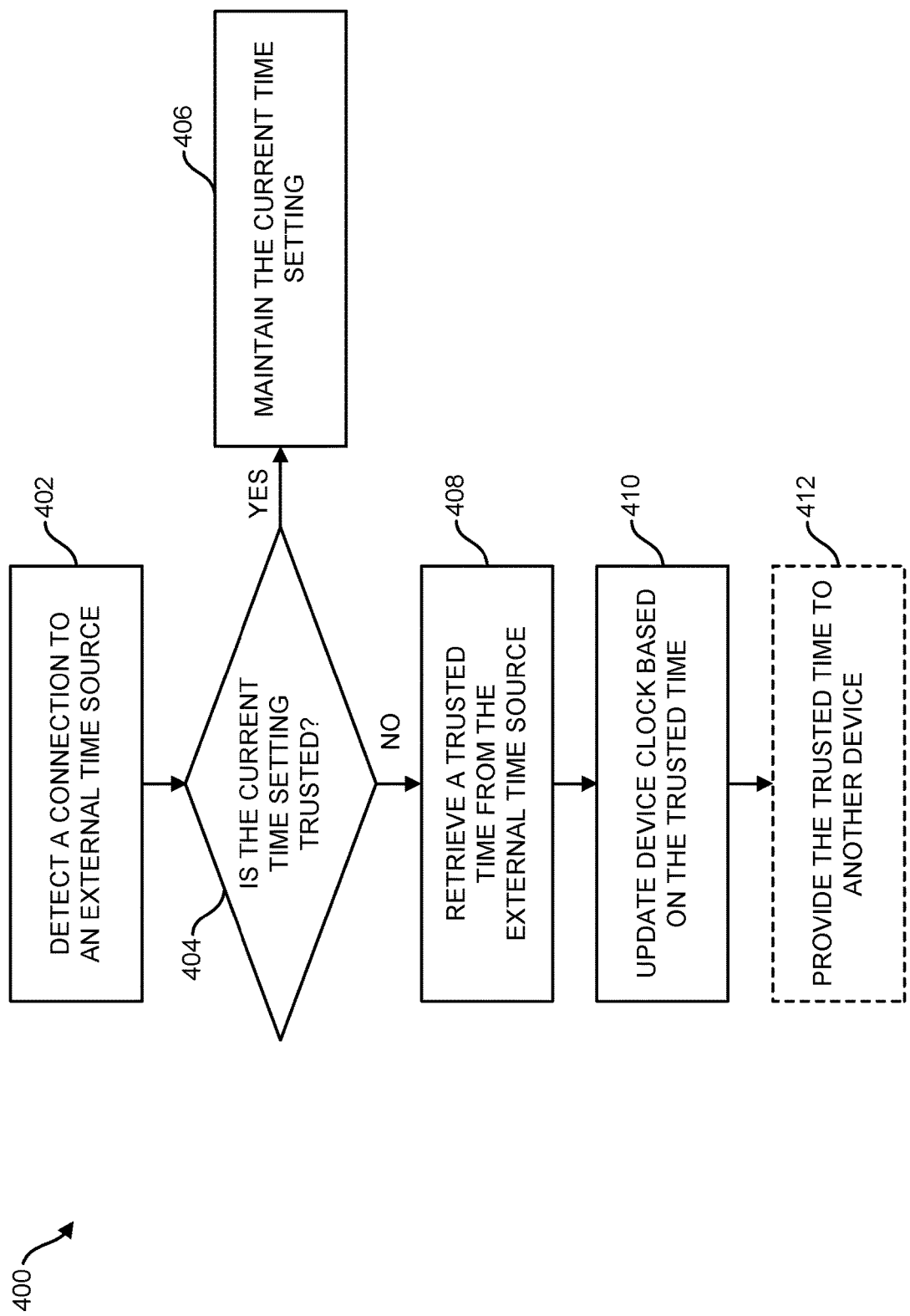
FIG. 4 depicts a flow diagram of a method for setting a device clock while booting a device, according to one or more examples of the present disclosure.

FIG. 4 depicts a flow diagram of a method 400 for setting a device clock while booting a device, according to one or more examples of the present disclosure. One or more of the peer devices 102 may perform the method 400 to further update its device clock to a more accurate time setting. In an example, the peer device 102-1 performs the method 400. Accordingly, the peer device 102-1 detects (402) a connection to the external time source 104. The peer device 102-1 determines (404) whether the current time setting of its device clock is trusted. For example, the current time setting of its device clock may be trusted where the peer device 102-1 updated its device clock based on a trusted peer clock time setting. When the peer device 102-1 determines (404) that the current time setting of its device clock is trusted, the peer device 102-1 maintains (406) the current time setting of its device clock.

However, when the peer device 102-1 determines (404) that the current time setting of its device clock is not trusted, the peer device 102-1 retrieves (408) a trusted time from the external time source 104. The peer device 102-1 updates (410) its device clock setting based on the trusted time from the external time source 104. In one example, the peer device 102-1 updates (410) its device clock to the trusted time from the external time source 104, for instance the time and date indicated by the trusted time. In another example, the peer device 102-1 adjusts the trusted time from the external time source 104 to generate a time setting for its device clock, which takes into consideration one or more additional parameters such as clock drift and/or transmission delay.

Upon updating (410) its device clock, the peer device 102-1 may provide (412) the trusted time from the external time source 104 to another peer device, e.g., the peer device 102-2 and/or the peer device 102-3, to further synchronize the device clocks of the peer devices 102. In another example, the peer device 102-2 provides the trusted time from the external time source 104 to one or more other computing devices over its network connection 108-1

Figure 5:
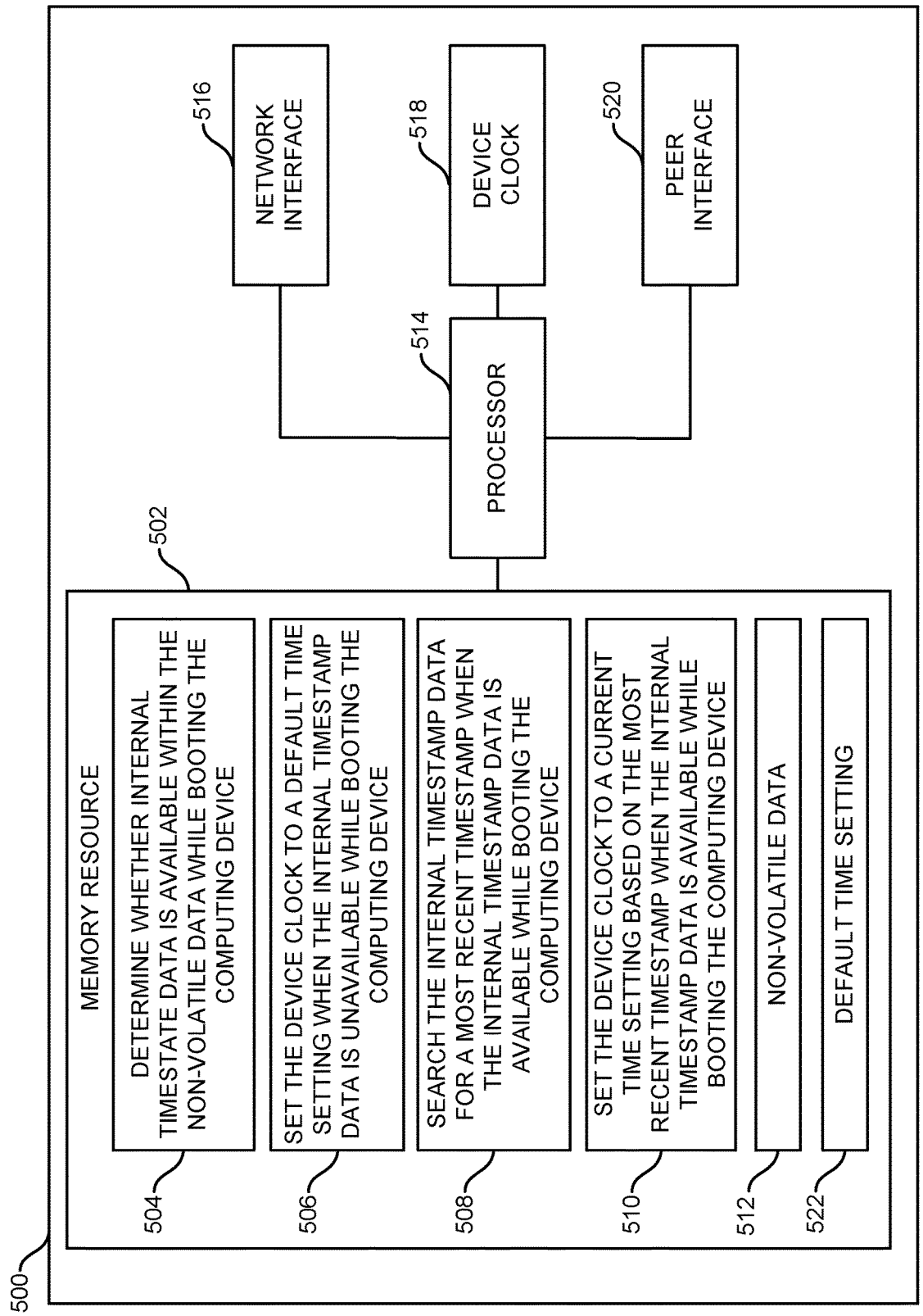
FIG. 5 depicts a computing device within which can be implemented a device clock setting while booting the computing device, according to one or more examples of the present disclosure.

FIG. 5 depicts a computing device 500 within which can be implemented a device clock setting while booting the computing device 500. In an example, the computing device 500 represents a physical embodiment of one or multiple of the peer devices 102. As illustrated, the computing device 500 includes hardware of a memory resource 502, a processor 514, a network interface 516, a device clock 518, and a peer interface 520, which are all operatively coupled.

The memory resource 502 may be a non-transitory medium configured to store various types of data. For example, memory resource 502 may include one or more storage devices that include a non-volatile storage device and/or volatile memory. Volatile memory, such as random-access memory (RAM), can be any suitable non-permanent storage device. The non-volatile storage devices can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices of the memory resource 502 may be used to a default time setting 522 and to store non-volatile data 512, which may contain internal time reference data such as timestamps, that the computing device 500 may use to set its device clock 518, according to one or more examples of the present disclosure.

The non-volatile storage devices of the memory resource 502 may also be used to store instructions that may be loaded into the RAM when such programs are selected for execution. In an example, the memory resource 502 stores executable instructions that, when executed by the processor 514, cause the processor 514 to perform one or more methods or portions thereof for setting its device clock 518 while booting the computing device 500. In a particular example, the executable instructions may cause the processor 514 to perform one or more of the methods 200, 300, 400 or portions thereof in accordance with the present disclosure.

As illustrated, the memory resource 502 stores executable instructions 504, 506, 508, and 510. Instruction 504, when executed by the processor 514, causes the processor 514 to determine whether internal timestamp data is available within the non-volatile data 512 while booting the computing device 500. Instruction 506, when executed by the processor 514, causes the processor 514 to set the device clock 518 to the default time setting 522 when the internal timestamp data is unavailable while booting the computing device 500. Instruction 508, when executed by the processor 514, causes the processor 514 to search the internal timestamp data for a most recent timestamp when the internal timestamp data is available while booting the computing device 500. Instruction 510, when executed by the processor 514, causes the processor 514 to set the device clock 518 to a current time setting based on the most recent timestamp when the internal timestamp data is available while booting the computing device 500.

The processor 514 may contain one or more hardware processors, where each hardware processor may have a single or multiple processor cores. Examples of processors include, but are not limited to, a central processing unit (CPU) and a microprocessor. Although not illustrated in FIG. 5, the processing elements that make up processor 514 may also include one or more of other types of hardware processing components, such as graphics processing units (GPU), application specific integrated circuits (ASICs), field-programmable gate arrays (FPGAs), and/or digital signal processors (DSPs).

The device clock 518 measures system time, which may be a simple count of the number of ticks that have transpired since a starting date for the device clock 518. In The starting date may be set using one or more methods according to the present disclosure. The starting date may be the default time setting 522, which in Unix and POSIX-compliant systems is Jan. 1, 1970. In an example, the system time of the device clock 518 may be converted into calendar time.

The network interface 516 facilitates a network connection, and the peer interface 520 facilitates a direct connection with a peer computing device, for instance within a cluster of peer devices. In an example, the interfaces 516, 520 are part of a network communication unit that may include a wired communication component and/or a wireless communications component, which may be communicatively coupled to the processor 514. The network communication unit may utilize any of a variety of proprietary or standardized network protocols, such as Ethernet, TCP/IP, to name a few of many protocols, to effect communications between devices. Network communication units may also include one or more transceiver(s) that utilize the Ethernet, power line communication (PLC), WiFi, cellular, and/or other communication methods.

Figure 6:
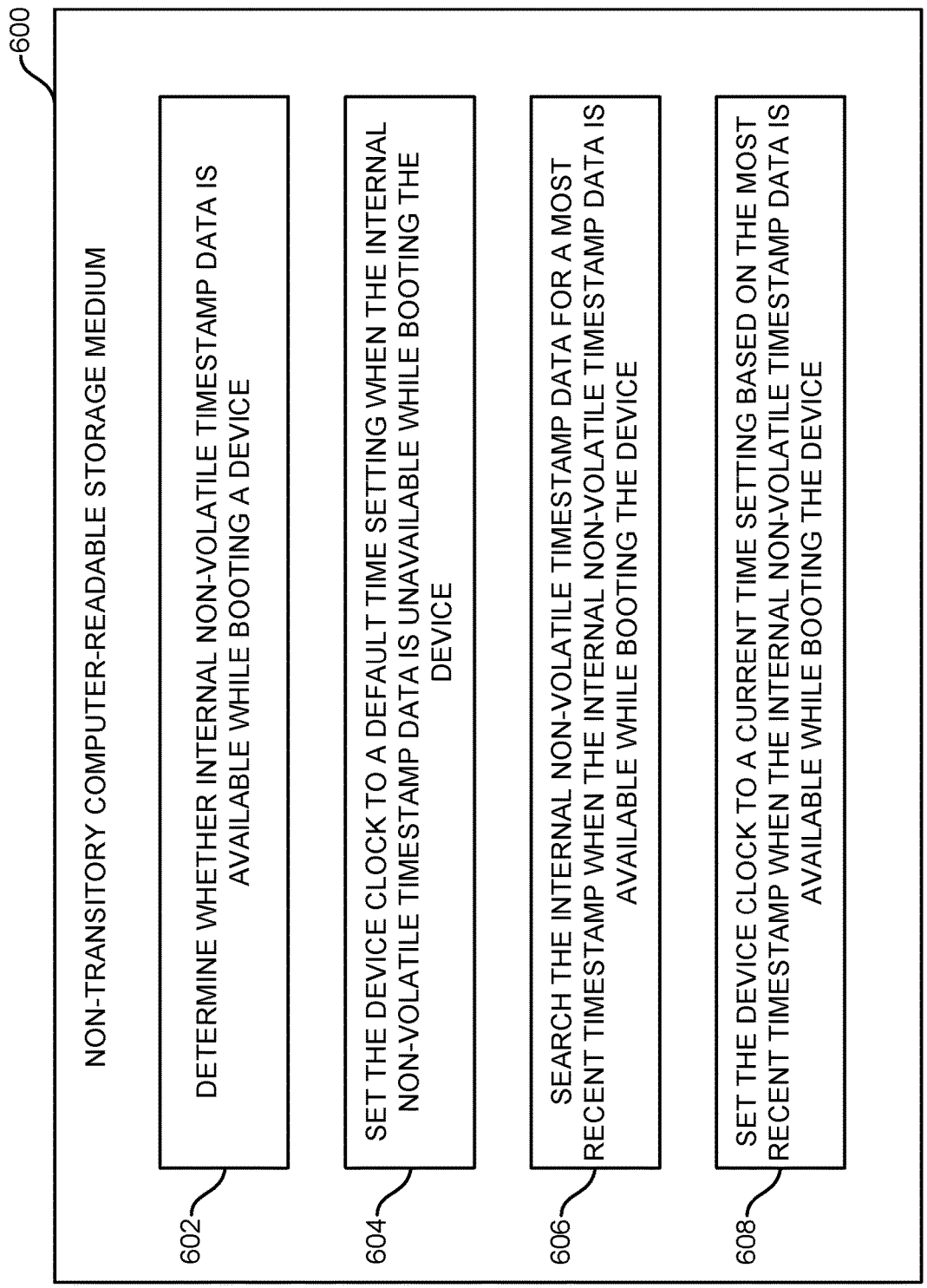
FIG. 6 depicts a non-transitory computer-readable storage medium storing executable instructions for setting a device clock while booting a device, according to one or more examples of the present disclosure.

FIG. 6 depicts a non-transitory computer-readable storage medium 600 storing executable instructions for setting a device clock while booting a device, such as the computing device 500 or the peer devices 102, according to one or more examples of the present disclosure. In an example, the non-transitory computer-readable storage medium 600 stores executable instructions that, when executed by a processor, cause the processor to perform one or more methods or portions thereof for setting its device clock while booting a computing device. In a particular example, the executable instructions may cause the processor to perform one or more of the methods 200, 300, 400 or portions thereof in accordance with the present disclosure.

As illustrated, the non-transitory computer-readable storage medium 600 stores executable instructions 602, 604, 606, and 608. Instruction 602, when executed by the processor, causes the processor to determine whether internal non-volatile timestamp data is available while booting the device. Instruction 604, when executed by the processor, causes the processor to set the device clock to a default time setting when the internal non-volatile timestamp data is unavailable while booting the device. Instruction 606, when executed by the processor, causes the processor to search the internal non-volatile timestamp data for a most recent timestamp when the internal non-volatile timestamp data is available while booting the device. Instruction 608, when executed by the processor, causes the processor to set the device clock to a current time setting based on the most recent timestamp when the internal non-volatile timestamp data is available while booting the device.

The non-transitory computer-readable storage medium 600 may be any available medium that may be accessed by a computing device. By way of example, the non-transitory computer-readable storage medium 600 may include RAM, ROM, EEPROM, CD-ROM or other optical disk storage, magnetic disk storage or other magnetic storage devices, or any other medium that may be used to carry or store desired program code in the form of instructions or data structures and that may be accessed by a computing device. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for setting a device clock while booting a device, the method comprising:
   determining whether internal time reference data is available while booting the device;
   setting the device clock to a default time setting when the internal time reference data is unavailable while booting the device;
   searching the internal time reference data for a most recent time reference when the internal time reference data is available while booting the device;
   setting the device clock to a current time setting based on the most recent time reference when the internal time reference data is available while booting the device;
   detecting a connection to a peer device within a cluster of peer devices, which also includes the device;
   determining whether a peer clock time setting is trusted;
   determining whether the peer clock time setting is more recent than the current time setting upon determining that the peer clock time setting is not trusted; and
   updating the clock setting based on the peer clock time setting upon determining that the peer clock time setting is trusted or determining that the peer clock time setting is more recent than the current time setting upon determining that the peer clock time setting is not trusted.

2. The method of claim 1, further comprising examining one or more internal non-volatile data sources to determine whether the internal time reference data is available while booting the device.

3. The method of claim 2, further comprising examining the internal non-volatile data sources for available timestamp data as the internal time reference data.

4. The method of claim 3, further comprising searching the timestamp data for a most recent timestamp as the most recent time reference.

5. The method of claim 4, further comprising setting the device clock to the current time setting based on the most recent timestamp.

6. The method of claim 1, further comprising:
sending the current time setting to the peer device and receiving a peer clock time setting from the peer device, when the current time setting is not trusted;
determining whether the peer clock time setting is more accurate than the current time setting; and
updating the device clock setting based on the peer clock time setting when the peer clock time setting is more accurate than the current time setting.

7. The method of claim 6, further comprising determining that the peer clock time setting is more accurate than the current time setting when the peer clock time setting is more recent than the current time setting.

8. The method of claim 6, further comprising determining that the peer clock time setting is more accurate than the current time setting when the peer clock time setting is trusted.

9. The method of claim 8, further comprising providing the peer clock time setting to another peer device in the cluster of peer devices.

10. The method of claim 1, further comprising:
detecting a connection to an external time source;
determining whether the current time setting is trusted; and
maintaining the device clock setting when the current time setting is trusted.

11. The method of claim 10, further comprising:
retrieving a trusted time from the external time source, when the current time setting is not trusted;
updating the device clock setting based on the trusted time.

12. The method of claim 11, further comprising providing the trusted time to another device.

13. The method of claim 1, wherein booting the device comprises a cold boot.

14. A non-transitory computer-readable storage medium comprising executable instructions that, when executed by a processor, causes the processor to:
determine whether internal non-volatile timestamp data is available while booting the device;
set the device clock to a default time setting when the internal non-volatile timestamp data is unavailable while booting the device;
search the internal non-volatile timestamp data for a most recent timestamp when the internal non-volatile timestamp data is available while booting the device;
set the device clock to a current time setting based on the most recent timestamp when the internal non-volatile timestamp data is available while booting the device;
detect a connection to a peer device within a cluster of peer devices, which also includes the device;
determine whether a peer clock time setting is trusted; and
determine whether the peer clock time setting is more recent than the current time setting upon determining that the peer clock time setting is not trusted;
update the clock setting based on the peer clock time setting upon determining that the peer clock time setting is trusted or determining that the peer clock time setting is more recent than the current time setting upon determining that the peer clock time setting is not trusted.

15. The non-transitory computer-readable storage medium of claim 14, further comprising executable instructions that, when executed by the processor, causes the processor to:
detect a connection to a peer device;
determine whether the current time setting is trusted;
maintain the device clock setting when the current time setting is trusted;
send the current time setting to the peer device and receive a peer clock time setting from the peer device, when the current time setting is not trusted;
determine whether the peer clock time setting is more accurate than the current time setting; and
update the device clock setting based on the peer clock time setting when the peer clock time setting is more accurate than the current time setting.

16. A computing device comprising:
a device clock;
a processor coupled to the device clock;
a memory resource coupled to the processor, the memory resource including non-volatile data and executable instructions that, when executed by the processor, cause the processor to:
determine whether internal timestamp data is available within the non-volatile data while booting the computing device;
set the device clock to a default time setting when the internal timestamp data is unavailable while booting the computing device;
search the internal timestamp data for a most recent timestamp when the internal timestamp data is available while booting the computing device;
set the device clock to a current time setting based on the most recent timestamp when the internal timestamp data is available while booting the computing device;
detect a connection to a peer device within a cluster of peer devices, which also includes the device;
determine whether a peer clock time setting is trusted; and
determine whether the peer clock time setting is more recent than the current time setting upon determining that the peer clock time setting is not trusted;
update the clock setting based on the peer clock time setting upon determining that the peer clock time setting is trusted or determining that the peer clock time setting is more recent than the current time setting upon determining that the peer clock time setting is not trusted; and
an interface coupled to the processor, the interface to communicatively couple to another device.

17. The computing device of claim 16, wherein:
the interface is to couple to a peer device; and
the memory resource includes executable instructions that, when executed by the processor, cause the processor to:

send the current time setting to the peer device and receive a peer clock time setting from the peer device, when the current time setting is not trusted;

determine whether the peer clock time setting is more accurate than the current time setting; and update the device clock setting based on the peer clock time setting when the peer clock time setting is more accurate than the current time setting.

18. The computing device of claim 16, wherein:

the interface comprises a network interface to couple to an external time source; and the memory resource includes executable instructions that, when executed by the processor, cause the processor to:

detect a connection to the external time source;

determine whether the current time setting is trusted;

maintain the device clock setting when the current time setting is trusted;

retrieve a trusted time from the external time source, when the current time setting is not trusted;

update the device clock setting based on the trusted time; and provide the trusted time to another device.

* * * * *